(12) United States Patent
Winnett (10) Patent No.: US 6,690,262 B1
(45) Date of Patent: Feb. 10, 2004

(54) SYSTEMS AND METHODS FOR TWO-WAY MESSAGING USING A PAGER

(75) Inventor: Steven Richard Winnett, Brookline, MA (US)

(73) Assignees: Genuity Inc., Burlington, MA (US); Verizon Corporate Services Group Inc., New York, NY (US)

( * ) Notice: Subject to any disclaimer, the term of this patent is extended or adjusted under 35 U.S.C. 154(b) by 0 days.

(21) Appl. No.: 09/422,306

(22) Filed: Oct. 21, 1999

(51) Int. Cl.[7] ................................................. H04Q 7/00
(52) U.S. Cl. ....................... 340/7.1; 340/7.21; 340/7.22; 340/7.29; 340/539.1; 340/539.11
(58) Field of Search ..................... 340/539.1, 7.21, 340/7.22, 7.23, 7.29, 7.31, 7.5, 539.11, 539.12; 379/88.17

(56) References Cited

U.S. PATENT DOCUMENTS

| | | | |
|---|---|---|---|
| 5,613,212 A | 3/1997 | Wong et al. ................ 455/53.1 |
| 5,638,450 A | 6/1997 | Robson ........................ 380/49 |
| 5,918,158 A | * 6/1999 | LaPorta et al. ............. 455/31.3 |
| 5,940,742 A | 8/1999 | Dent .......................... 455/31.3 |
| 6,249,809 B1 | * 6/2001 | Bro ............................. 709/217 |

\* cited by examiner

*Primary Examiner*—Daryl Pope
(74) *Attorney, Agent, or Firm*—Leonard Charles Suchyta; James K. Weixel (57) ABSTRACT

A system facilitates two-way messaging in a network that includes at least one paging device. The system includes a paging service provider and a server. The paging device generates a message intended for a called party and transmits the message to the paging service provider. The paging service provider forwards the message to the server. The server translates the message to a form used by the called party and sends the translated message to the called party.

7 Claims, 6 Drawing Sheets

SYSTEMS AND METHODS FOR TWO-WAY MESSAGING USING A PAGER

BACKGROUND OF THE INVENTION

A. Field of the Invention

The present invention relates generally to paging systems and, more particularly, to systems and methods for transmitting messages from a pager.

B. Description of Related Art

Over the last several decades, pagers have become important communication devices for contacting remotely-situated persons. The conventional paging systems were one-way systems. That is, the user received a paging message, usually including the paging party's telephone number or a brief message, from a central terminal, but had no way of responding to that message with the pager. If the user wanted to respond to the message in the conventional paging systems, the user needed to locate a telephone to call the paging party.

In more modern conventional paging systems, pagers, known as two-way pagers, have the capability of providing a response to a paging message. The response, however, typically takes the form of an acknowledgment. Other conventional systems permit the paged party to send a reply. The paging service typically stores the reply and requires the paging party to remember a confirmation number that the party can later use to determine if the paged party has left a reply to a paging message at the paging service.

As a result, a need exists for a paging system that permits a user to reply to a paging message by sending a reply to the paging party from the pager. A need also exists for a paging system that permits a user to initiate a message to a party from a pager.

SUMMARY OF THE INVENTION

Systems and methods consistent with the present invention address these needs by permitting a user to reply to paging messages and to initiate messages from a pager.

In accordance with the purpose of the invention as embodied and broadly described herein, a system facilitates two-way messaging in a network that includes at least one paging device. The system includes a paging service provider and a server. The paging device generates a message intended for a called party and transmits the message to the paging service provider. The paging service provider forwards the message to the server. The server translates the message to a form used by the called party and sends the translated message to the called party.

In another implementation consistent with the present invention, a system includes a paging service provider and a server. The paging service provider receives a paging message from a paging party, delivers the paging message to a paging device, and receives a reply message from the paging device. The server receives the reply message from the paging service provider, translates the reply message to a form used by the paging party, and sends the translated reply message to the paging party.

In yet another implementation consistent with the present invention, a paging apparatus includes an input device and a processor. The input device generates a message and contact information for a called party through operation by a user of the paging apparatus. The processor receives the message and contact information from the input device and transmits the message to the called party using the contact information.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention provide two-way messaging in a low-cost portable device.

Exemplary System

Figure 1:
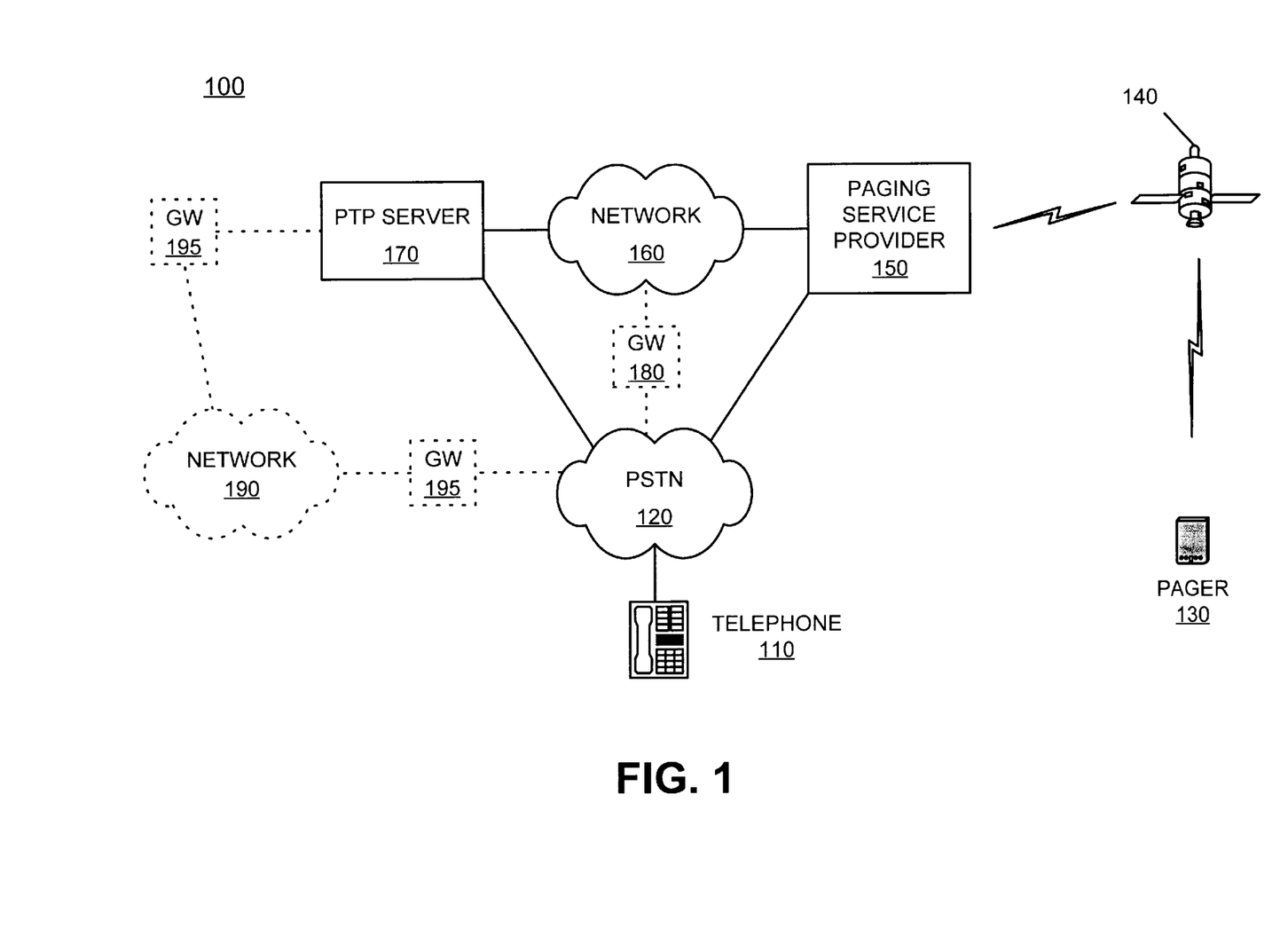
FIG. 1 is a diagram of an exemplary system consistent with the present invention.

FIG. 1 is an exemplary system 100 consistent with the present invention. The system 100 includes a telephone 110, the Public Switched Telephone Network (PSTN) 120, a pager 130, at least one satellite 140, a paging service provider 150, a network 160, and a pager-to-phone (PTP) server 170. The telephone 110 may include any conventional device that can place and receive telephone calls over PSTN 120.

Figure 2:
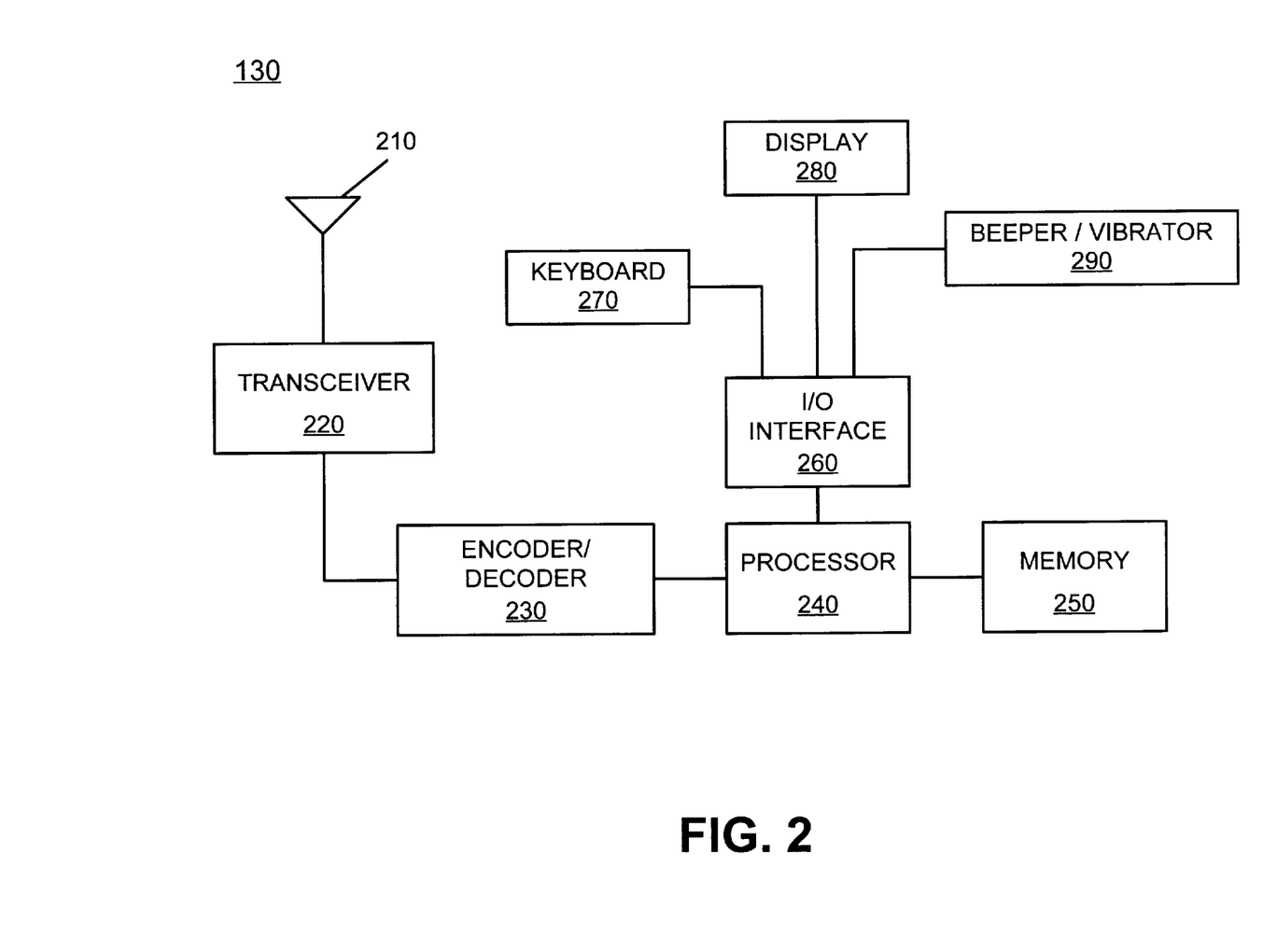
FIG. 2 is a detailed diagram of an exemplary pager in the system of FIG. 1.

The pager 130 is a two-way paging device. FIG. 2 is an exemplary diagram of the pager 130. The pager 130 includes an antenna 210, a transceiver 220, an encoder/decoder 230, a processor 240, a memory 250, an input/output (I/O) interface 260, a keyboard 270, a display 280, and a beeper and/or vibrator 290. The antenna 210 may include a conventional antenna that can transmit and receive information. The transceiver 220 may include a conventional transceiver that facilitates the transmitting and receiving of information by the antenna 210.

The encoder/decoder 230 may include hardware and/or software that encodes the information transmitted by the transceiver 220 and that decodes the information received by the transceiver 220. The processor 240 may include any conventional processor or microprocessor that executes instructions to control the operation of the pager 130. The memory 250 may include static memory, such as a read only memory (ROM), dynamic memory, such as a random access memory (RAM), or any combination of the two. Among other things, the memory 250 stores instructions and data used by the processor 240.

The I/O interface 260 connects the processor 240 to input and output devices, such as the keyboard 270, the display 280, and the beeper and/or vibrator 290. The keyboard 270 may include a combination of function keys and alphanumeric keys to permit a user to control the operation of the pager 130 and formulate text messages. The display 280 may include a multi-line liquid crystal display (LCD) to provide messages to the user. The beeper and/or vibrator 290 notifies the user of an incoming message by outputting an audible tone and/or by causing the pager 130 to vibrate.

Returning to FIG. 1, the pager 130 communicates with a satellite 140 via a wireless communication stream. The satellite 140 may include any combination of stationary and/or orbiting satellites capable of communicating with the pager 130. The satellite 140 relays signals between the pager 130 and the paging service provider 150. The paging service provider 150 controls the paging service, including the receipt and delivery of paging messages.

Figure 3:
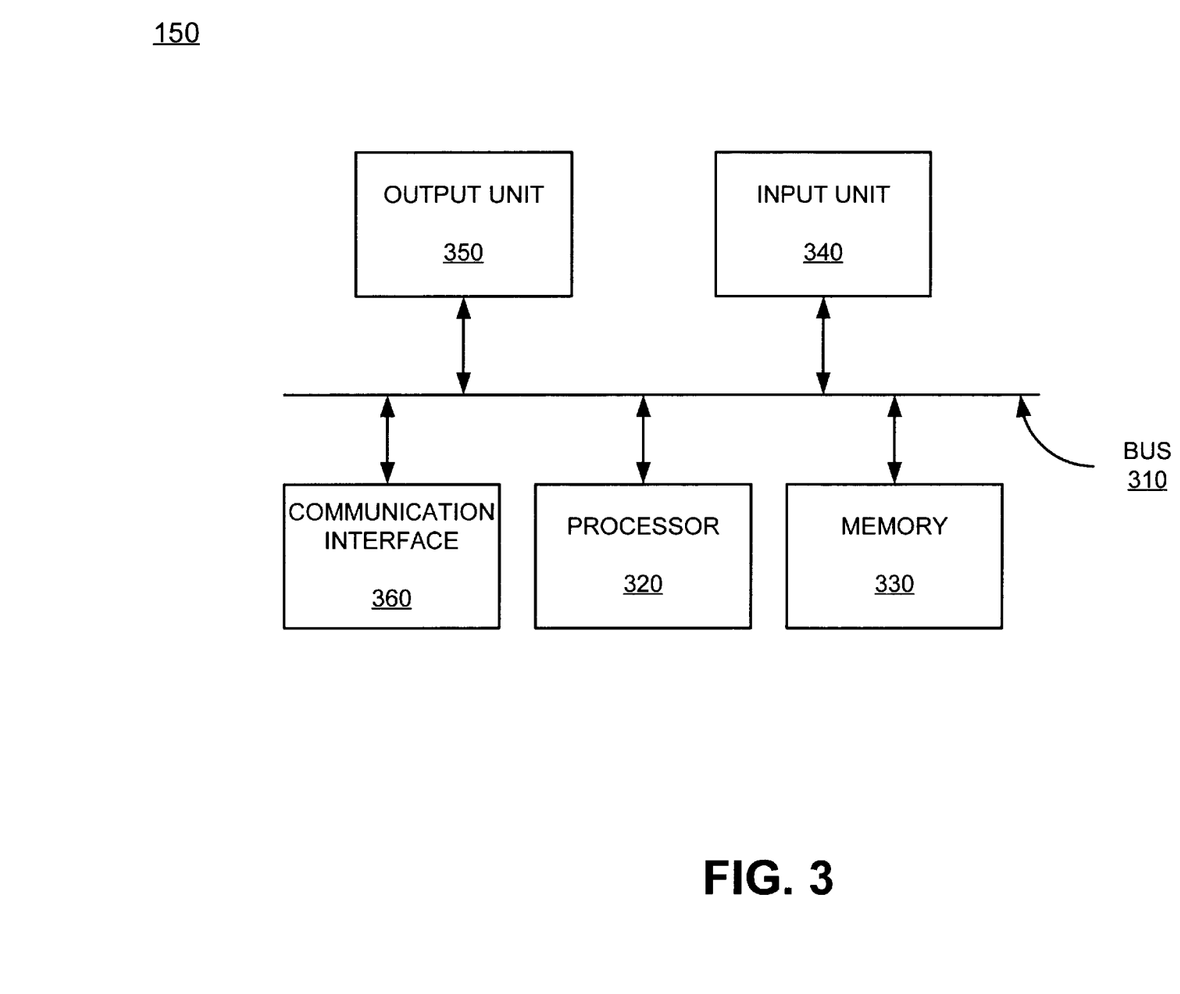
FIG. 3 is a detailed diagram of an exemplary paging service provider in the system of FIG. 1.

FIG. 3 is an exemplary diagram of the paging service provider 150. The paging service provider 150 includes a bus 310, a processor 320, a memory 330, an input unit 340, an output unit 350, and a communication interface 360. The bus 310 permits communication among the components of the paging service provider 150. The processor 320 may be any type of conventional processor or microprocessor that interprets and executes instructions. The memory 330 may be a RAM or other dynamic storage device that stores information and instructions to be executed by the processor 320; a ROM or other type of static storage device that stores static information and instructions for use by the processor 320; and/or some other type of magnetic or optical recording medium and its corresponding drive.

The input unit 340 may include any conventional mechanism that permits an operator to input information into the service provider 150, such a keyboard, a mouse, a pen, voice recognition and/or biometric mechanisms, etc. The output unit 350 may include any conventional mechanism that outputs information to the operator, including a display, a printer, a pair of speakers, etc. The communication interface 360 may include any transceiver-like mechanism that enables the paging service provider 150 to communicate with other devices and/or systems. For example, the communication interface 360 may include mechanisms for communicating via a data network, such as the Internet, a telephone network, such as PSTN 120 (FIG. 1), or a satellite, such as satellite 140.

Returning to FIG. 1, the paging service provider 150 connects to a network 160. The network 160 may include the Internet, an intranet, a local area network (LAN), a wide area network (WAN), etc. The network 160 facilitates communication between the paging service provider 150 and the PTP server 170. The PTP server 170 facilitates the transmission of messages originating at the pager 130 to a device connected to the PSTN 120, such as telephone 110.

As illustrated in FIG. 1, the PTP server 170 may communicate with the telephone 110 by initiating a telephone call over the PSTN 120. In an alternative implementation consistent with the present invention, the PTP server 170 communicates with the telephone 110 by initiating a telephone call through network 160. In this case, the network 160 routes the call to the PSTN 120 via a conventional gateway 180. In another alternative implementation consistent with the present invention, the PTP server 170 communicates with the telephone 110 by initiating a telephone call through a network 190. The network 190 may include the Internet, an intranet, a LAN, a WAN, or an equivalent data network. In this case, the network 190 routes the call to the PSTN 120 via conventional gateways 195.

Figure 4:
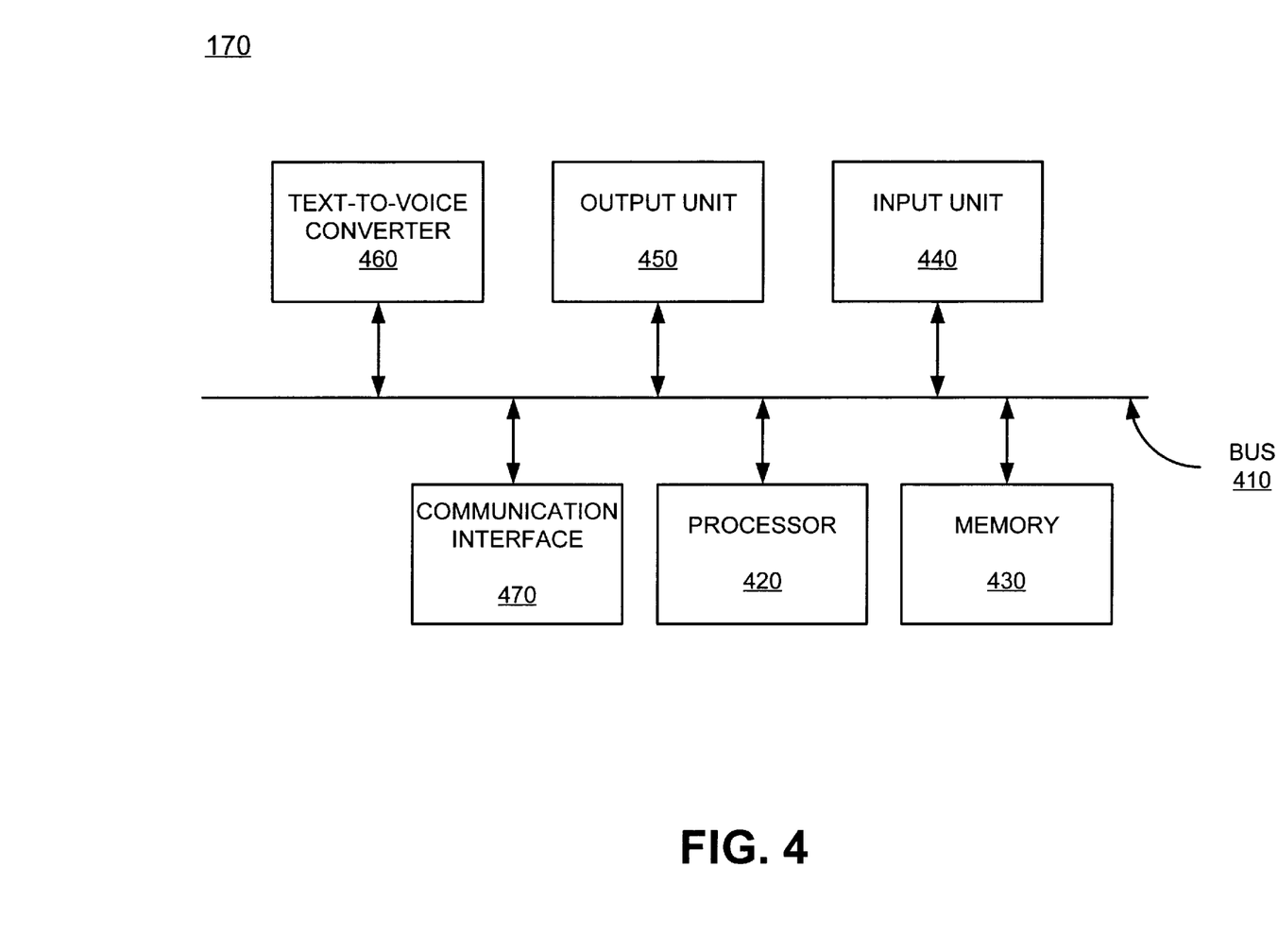
FIG. 4 is a detailed diagram of an exemplary pager-to-telephone server in the system of FIG. 1.

FIG. 4 is an exemplary diagram of PTP server 170. The PTP server 170 includes a bus 410, a processor 420, a memory 430, an input unit 440, an output unit 450, a text-to-voice converter 460, and a communication interface 470. The bus 410 permits communication among the components of the PTP server 170. The processor 420 may be any type of conventional processor or microprocessor that interprets and executes instructions. The memory 430 may be a RAM or other dynamic storage device that stores information and instructions to be executed by the processor 420; a ROM or other type of static storage device that stores static information and instructions for use by the processor 420; and/or some other type of magnetic or optical recording medium and its corresponding drive.

The input unit 440 may include any conventional mechanism that permits an operator to input information into the PTP server 170, such a keyboard, a mouse, a pen, voice recognition and/or biometric mechanisms, etc. The output unit 450 may include any conventional mechanism that outputs information to the operator, including a display, a printer, a pair of speakers, etc. The text-to-voice converter 460 converts data in text format to a digitized voice format. The text-to-voice converter 460 may use any conventional translation algorithm to perform the conversion.

The communication interface 470 may include any transceiver-like mechanism that enables the PTP server 170 to communicate with other devices and/or systems. For example, the communication interface 470 may include mechanisms for communicating via a network, such as networks 160 and 190 (FIG. 1), or a telephone network, such as PSTN 120.

Exemplary System Processing for Replying to a Page

Figure 5:
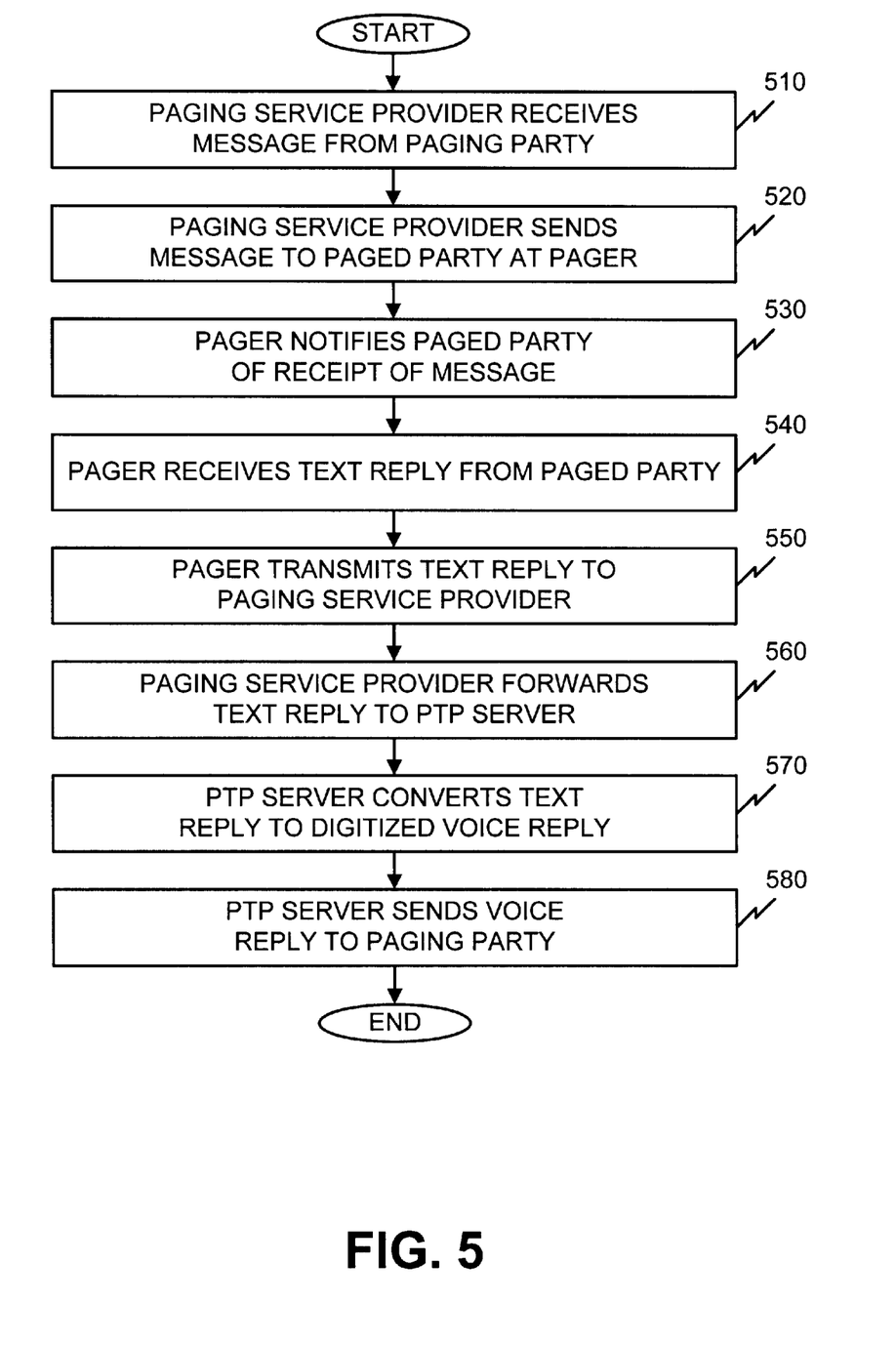
FIG. 5 is a flowchart of processing for replying to a paging message in a manner consistent with the present invention.

FIG. 5 is a flowchart of processing for replying to a page in a manner consistent with the present invention. Processing begins when a paging party using, for example, telephone 110 initiates a page by calling a telephone number associated with pager 130. By calling the telephone number, the telephone 110 connects to the paging service provider 150 via PSTN 120. The paging party then sends a page message to the paging service provider 150. The paging party also transmits a telephone number to which the paged party may send a reply.

The paging service provider 150 receives the message and telephone number from the paging party [step 510]. The provider 150 then encodes the message and telephone number into a paging signal and transmits the signal to the pager 130 via satellite 140 [step 520]. The pager 130 receives the paging signal and notifies the paged party of its receipt [step 530]. The pager 130 may notify the paged party by emitting an audible tone or by vibrating the pager 130 using beeper and/or vibrator 290 (FIG. 2) or by simply displaying a message on display 280. Upon notifying the paged party, the encoder/decoder 230 within the pager 130 decodes the signal and displays the decoded message on the display 280.

If the paged party decides to reply to the message, the party inputs the reply using the keyboard 270. The reply is a text message that the party may generate using the alphanumeric keys of the keyboard 270. The pager 130 receives the reply from the paged party [step 540], encodes it along with the telephone number of the paging party, and transmits it to the paging service provider 150 via satellite 140 [step 550].

The paging service provider 150 decodes the encoded message and forwards the reply and telephone number to the PTP server 170 via the network 160 [step 560]. The PTP server 170 receives the reply and telephone number and converts the reply from text form to digitized voice [step 570]. The PTP sever 170 then uses the telephone number to place a call to the paging party over the PSTN 120, either directly, or via network 160 or network 190. Once the connection has been established, the PTP server 170 sends the digitized voice reply to the paging party [step 580]. The PTP server 170 might be set up to retry the call several times if the telephone number is busy.

Exemplary System Processing for Initiating a Message

Figure 6:
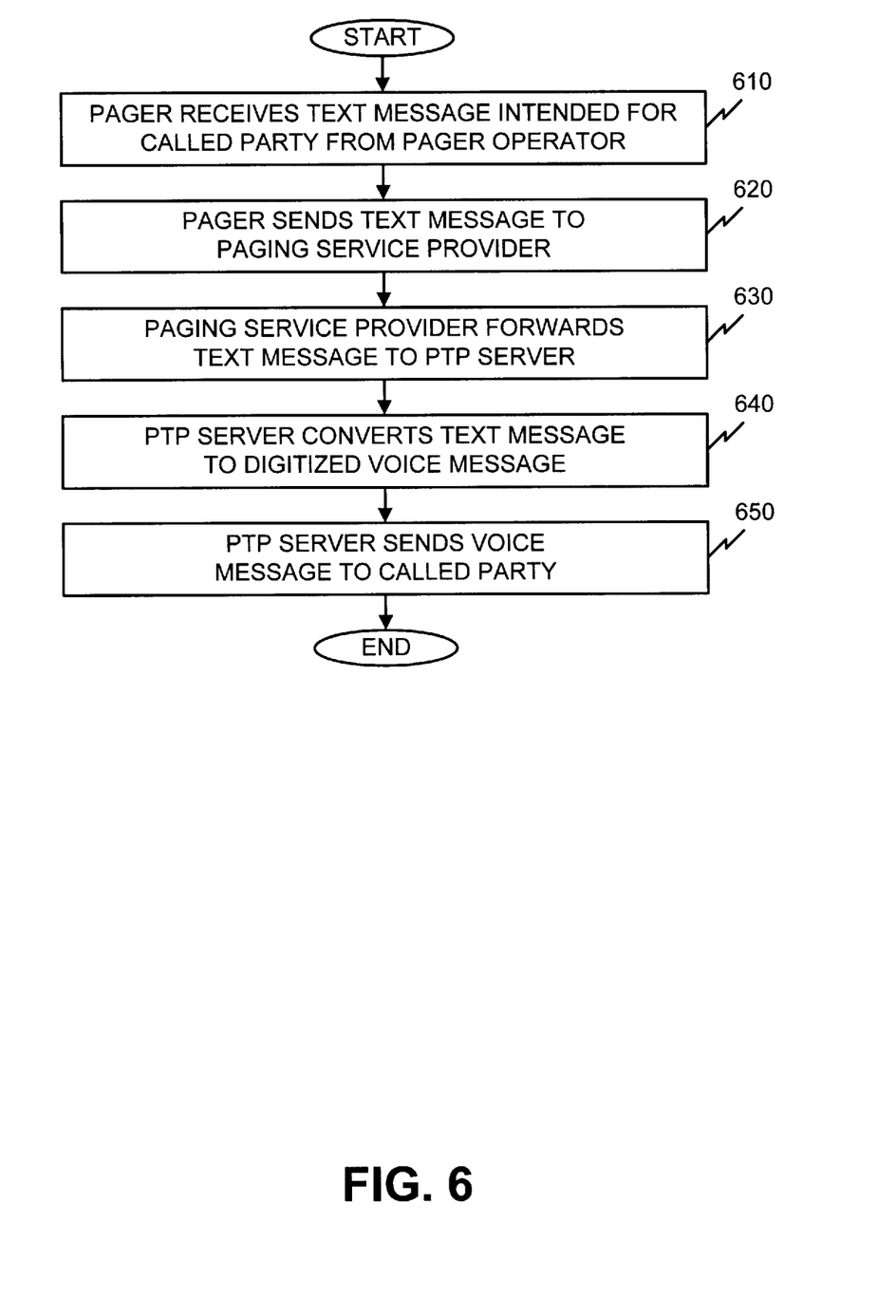
FIG. 6 is a flowchart of processing for initiating a message in a manner consistent with the present invention.

FIG. 6 is a flowchart of processing for initiating a message in a manner consistent with the present invention. Processing begins when a user of the pager 130 decides to send a message to a called party who operates, for example, the telephone 110. The user inputs a message into the pager 130 using the keyboard 270. The message is a text message that the user may generate using the alphanumeric keys of the keyboard 270. The message includes contact information, such as the telephone number, of the called party.

The pager 130 receives the text message [step 610], encodes it, and transmits it to the paging service provider 150 via satellite 140 [step 620]. The paging service provider 150 decodes the message and forwards it to the PTP server 170 via network 160 [step 630]. The PTP server 170 receives the message and converts it from text form to digitized voice [step 640]. The PTP sever 170 then uses the telephone number input at step 610 to place a call to the called party over the PSTN 120, either directly or via network 160 or network 190. Once the connection has been established, the PTP server 170 sends the digitized voice message to the called party [step 650]. The PTP server 170 might be set up to retry the call several times if the telephone number is busy.

CONCLUSION

Systems and methods consistent with the present invention permit a pager operator to not only receive messages using the pager, but to reply to the messages and initiate messages using only the pager. These systems and methods provide a very low-cost alternative to cellular telephones and other forms of portable communication devices.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

The PTP server 170 has been described as including a text-to-voice converter. Additionally or alternatively, the PTP server 170 may include other converters for sending messages to different types of devices. For example, the telephone of FIG. 1 may be replaced with an Analog Display Services Interface (ADSI) phone capable of receiving voice or ADSI text messages; a cellular or mobile telephone capable of receiving voice and/or Short Messaging Service (SMS) text messages; a computer terminal capable of receiving voice and/or email messages; a facsimile device capable of receiving voice and/or fax messages; etc.

In the case of an ADSI phone, the PTP server 170 may include a text-to-voice converter and/or a text-to-ADSI text converter. In the case of cellular or mobile telephones, the PTP server 170 may include a text-to-voice converter and/or a text-to-SMS text converter. In the case of a computer terminal, the PTP server 170 may include a text-to-voice converter and/or a text-to-email converter. In the case of a facsimile device, the PTP server 170 may include a text-to-voice converter and/or a text-to-facsimile text converter.

What is claimed is:

1. A system that communicates with a paging device, comprising:

a paging service provider configured to:
receive a paging message and a telephone number from a paging party using a telephone device,
encode the paging message and the telephone number into a paging signal,
deliver the paging signal to the paging device,
receive an encoded reply message from the paging device, the encoded reply message including a text reply and the telephone number from the paging party, and
decode the encoded reply message to extract the text reply and the telephone number; and a server connected to the paging service provider and configured to:
receive the text reply and the telephone number from the paging service provider,
translate the text reply to a voice message, and
place a call to the telephone device of the paging party to send the voice message to the paging party using the telephone number.

2. The system of claim 1, wherein the server includes:
a text-to-voice converter configured to translate the text reply to a digitized voice message for delivery to the telephone device.

3. A system for communicating with a paging device, comprising:
means for receiving a paging message and a telephone number from a paging party using a telephone device;
means for delivering the paging message and the telephone number to the paging device;
means for receiving a reply message from the paging device, the reply message including a text reply and the telephone number;
means for translating the text reply to a voice reply; and
means for sending the voice reply to the telephone device of the paging party using the telephone number.

4. A method for communicating with a paging device in a network including a paging service provider and a server, the method comprising:
receiving, at the paging service provider, a paging message and a telephone number from a paging party using a telephone device;
delivering the paging message and the telephone number to the paging device;
receiving, at the paging service provider, a reply message and the telephone number from the paging device;
transmitting the reply message and the telephone number to the server;
translating, at the server, the reply message to a voice message; and
sending the voice message to the telephone device of the paging party using the telephone number.

5. The method of claim 4, further comprising:
encoding the paging message and the telephone number into a paging signal.

6. The method of claim 5, wherein the delivering the paging message and the telephone number includes:
transmitting the paging signal to the paging device.

7. The method of claim 4, wherein the receiving a reply message and the telephone number includes:
  receiving an encoded reply signal from the paging device, and
  decoding the encoded reply signal to extract the reply message and the telephone number.

* * * * *